Feb. 24, 1959  N. MARKOFF  2,874,875
DISPENSER CONTROL MECHANISM
Filed March 25, 1957  9 Sheets-Sheet 1

NICHOLAS MARKOFF
INVENTOR.

BY Edmund W. E. Kamm
ATTORNEY

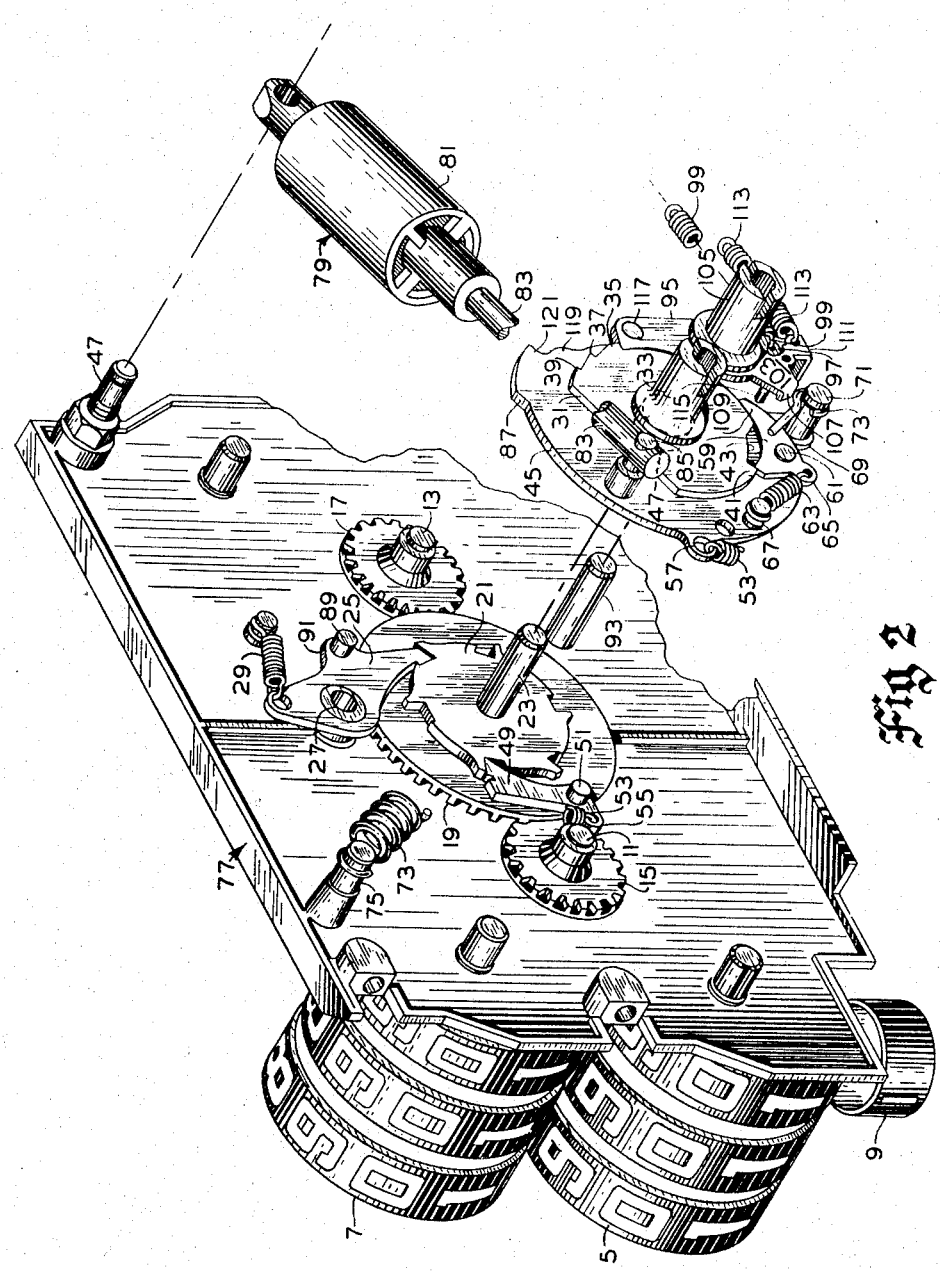

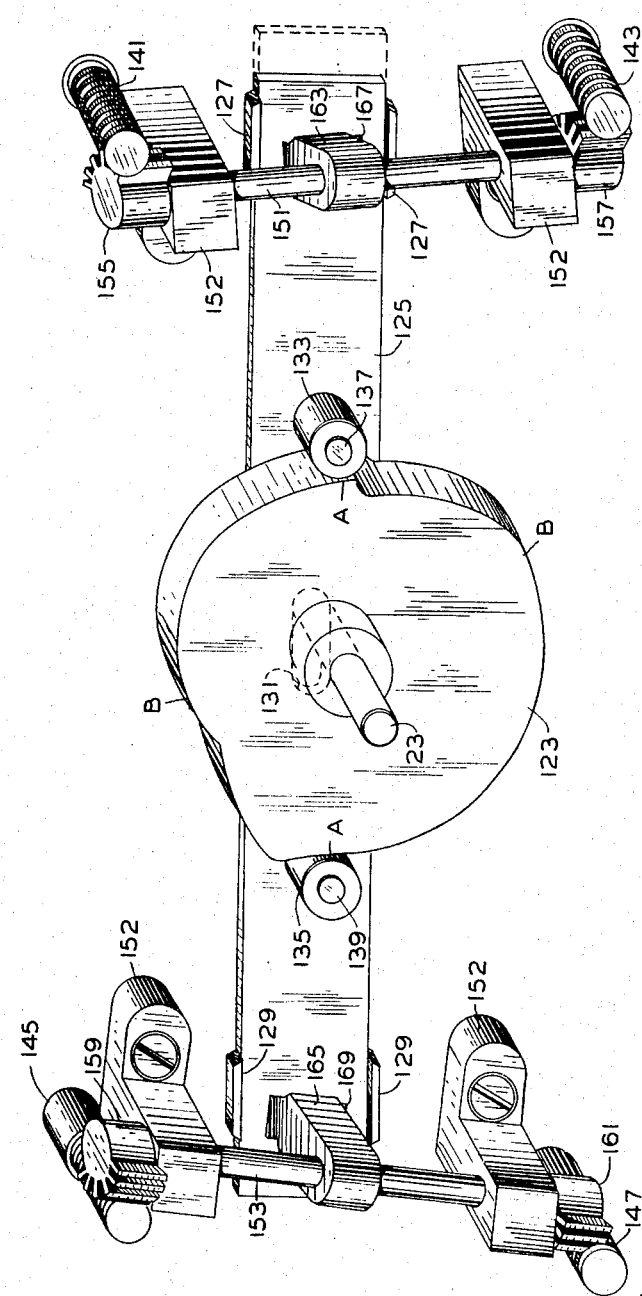

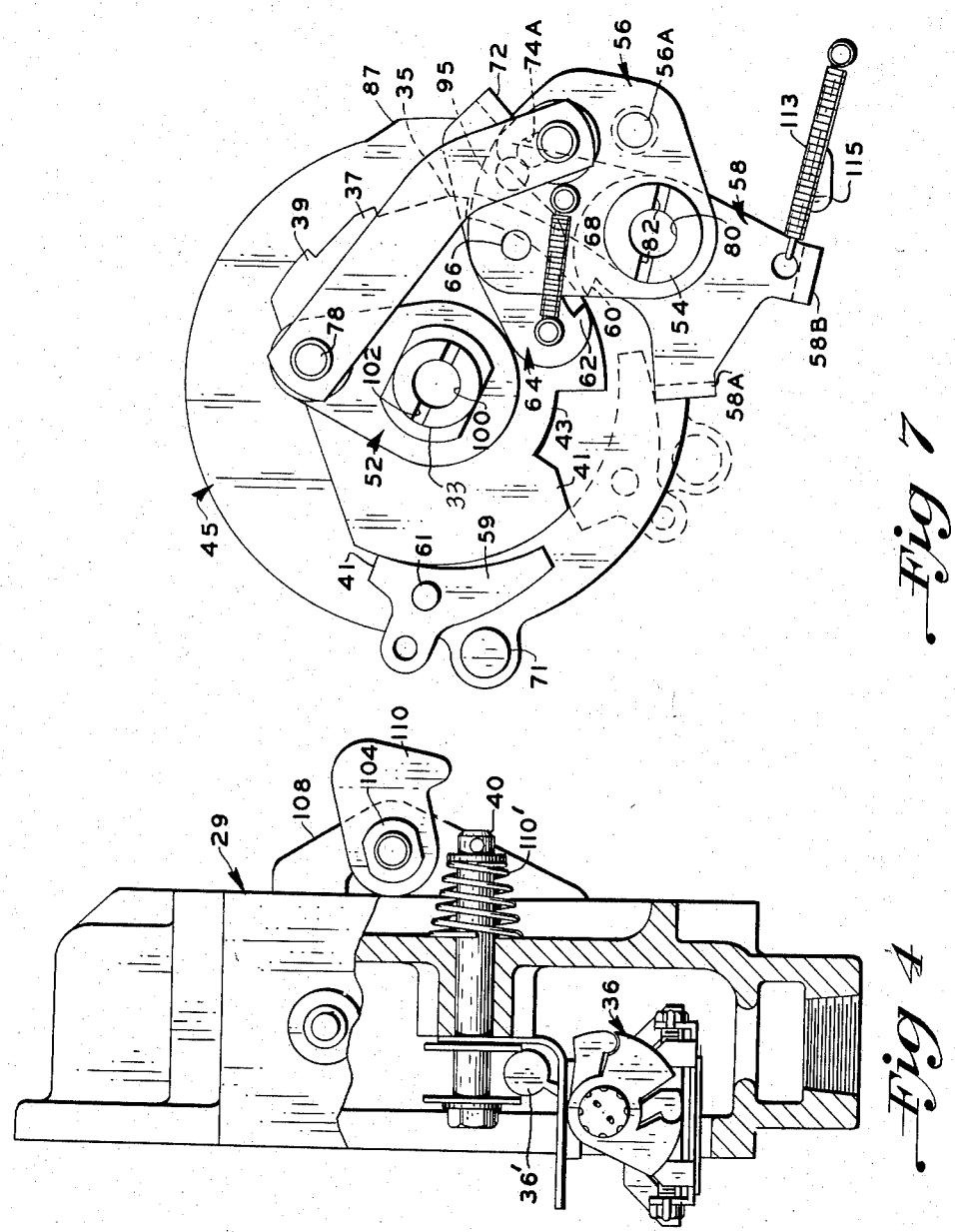

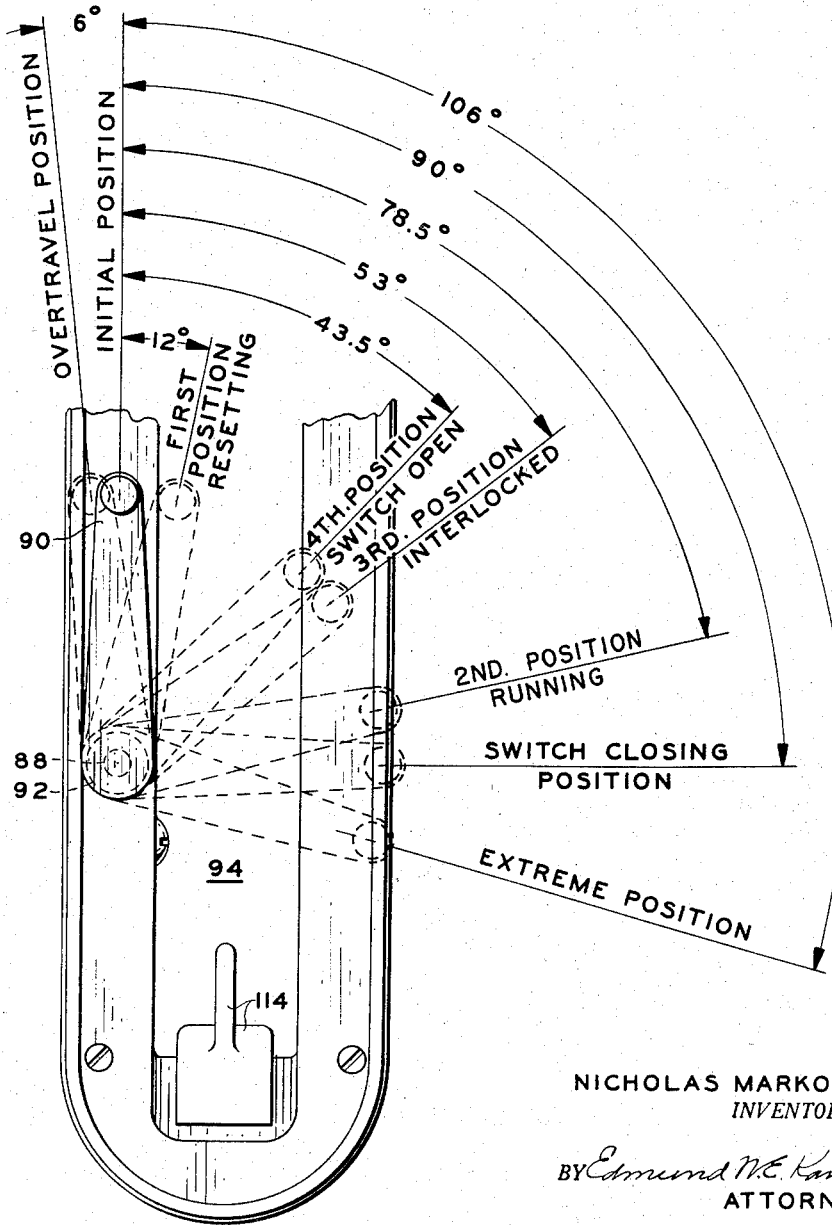

Feb. 24, 1959    N. MARKOFF    2,874,875
DISPENSER CONTROL MECHANISM
Filed March 25, 1957    9 Sheets-Sheet 6

NICHOLAS MARKOFF
INVENTOR.

BY Edmund W. E. Kamm
ATTORNEY

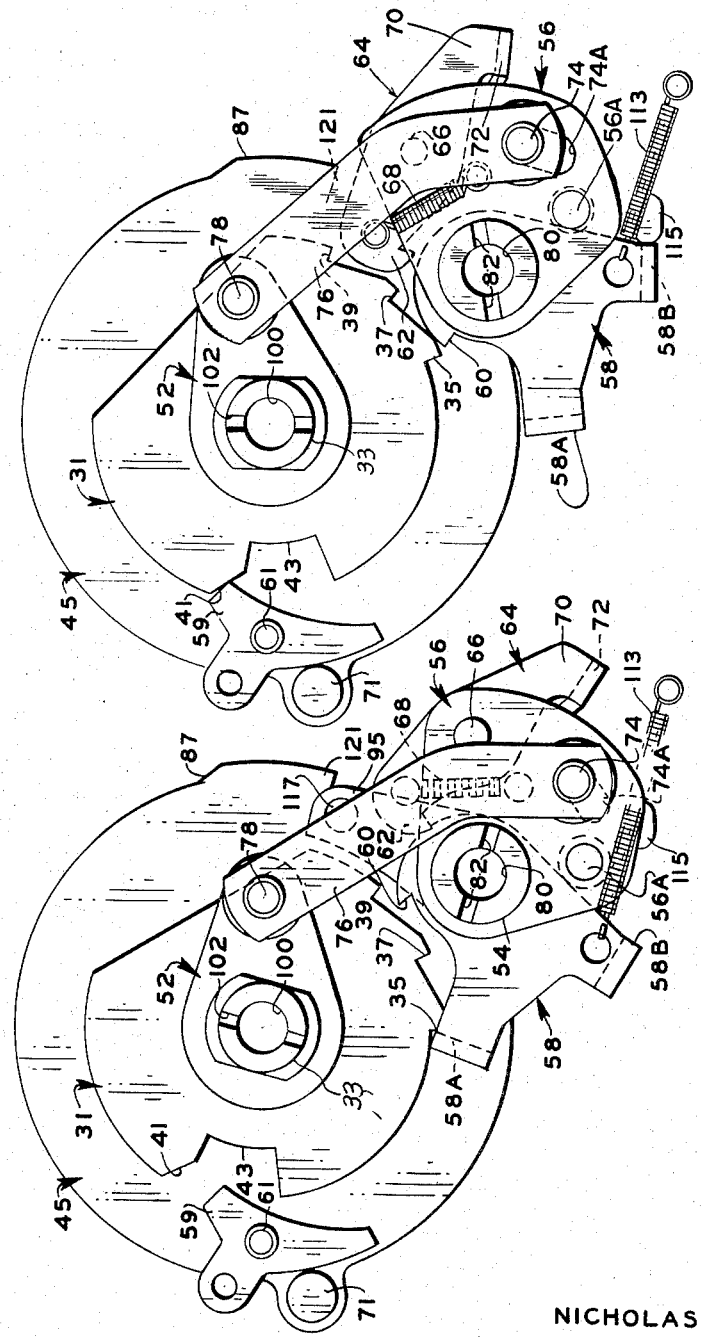

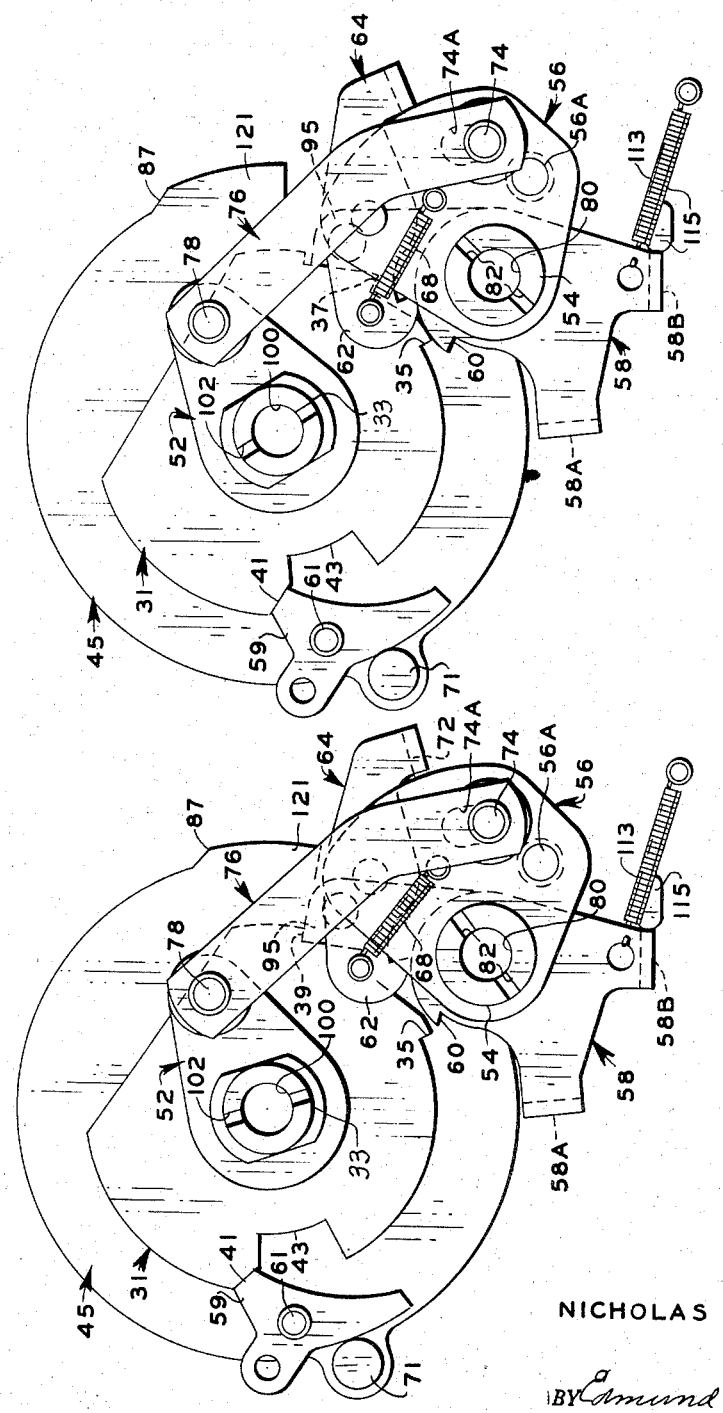

NICHOLAS MARKOFF
INVENTOR.

BY Edmund W. E. Kamm
ATTORNEY

United States Patent Office 2,874,875
Patented Feb. 24, 1959

2,874,875

DISPENSER CONTROL MECHANISM

Nicholas Markoff, Fort Wayne, Ind., assignor to Tokheim Corporation, Fort Wayne, Ind., a corporation of Indiana Application March 25, 1957, Serial No. 648,299

20 Claims. (Cl. 222—35)

This invention relates to a dispenser control mechanism. More specifically it relates to a mechanism for opening and closing the motor control switch of a liquid dispenser, under the control of the resetting and interlock mechanism which is provided as an integral portion of the register which in turn forms a part of the dispenser.

It is an object of the invention to provide a mechanism which, except for the switch and operating handle, can be mounted entirely on the register.

Another object of the invention is to provide a mechanism of the kind described which can be applied to the register without alteration of the register other than by the removal of certain existing parts and the addition of other parts.

A further object of the invention is to provide a mechanism of the kind described which is rugged, simple, durable and positive in operation.

Yet another object of the invention is to provide a mechanism which will eliminate complex link and lever systems which, by going out of adjustment, render useless the resetting and interlocking features of the register.

A still further object of the invention is to provide a mechanism in which the various parts which must interact to produce the various functions, are mounted for operation on shafts which are rigidly supported, in predetermined fixed relationships, on a common component so that the relations and interaction of said parts are unaffected by unavoidable manufacturing variations or by changes in the relative positions of various components of the dispenser after assembly.

It is still another object of the invention to provide a structure which is compact, easy to manufacture and which is relatively inexpensive.

A further object of the invention is to provide a structure which will enable the interlock structure of the register to prevent operation of the control mechanism to reclose the motor control switch until the resetting of the register has been effected.

These and other objects will become apparent from a study of this specification and the drawings which we attach hereto, make a part hereof and in which:

Figure 2 is a perspective view of a portion of a commercial computer showing the resetting and interlocking mechanism.

Figure 3 is a perspective view of the register clutch operating means.

Figure 4 is an elevation with parts in section showing the motor control switch mechanism.

Figure 5 is a side elevation of the dispenser showing the various phase positions of the operating handle and its relation to the nozzle boot and support.

Figure 7 is similar to Figure 6 but shows the mechanism in its reset position corresponding to the first position of the handle.

Figure 8 shows the mechanism in the position corresponding to the extreme position of the handle.

Figure 9 shows the mechanism in running position corresponding to the second position of the handle.

Figure 10 shows the mechanism in first interlocked position corresponding to the third position of the handle.

Figure 11 shows the mechanism in switch open position corresponding to the fourth position of the handle.

Figure 1:
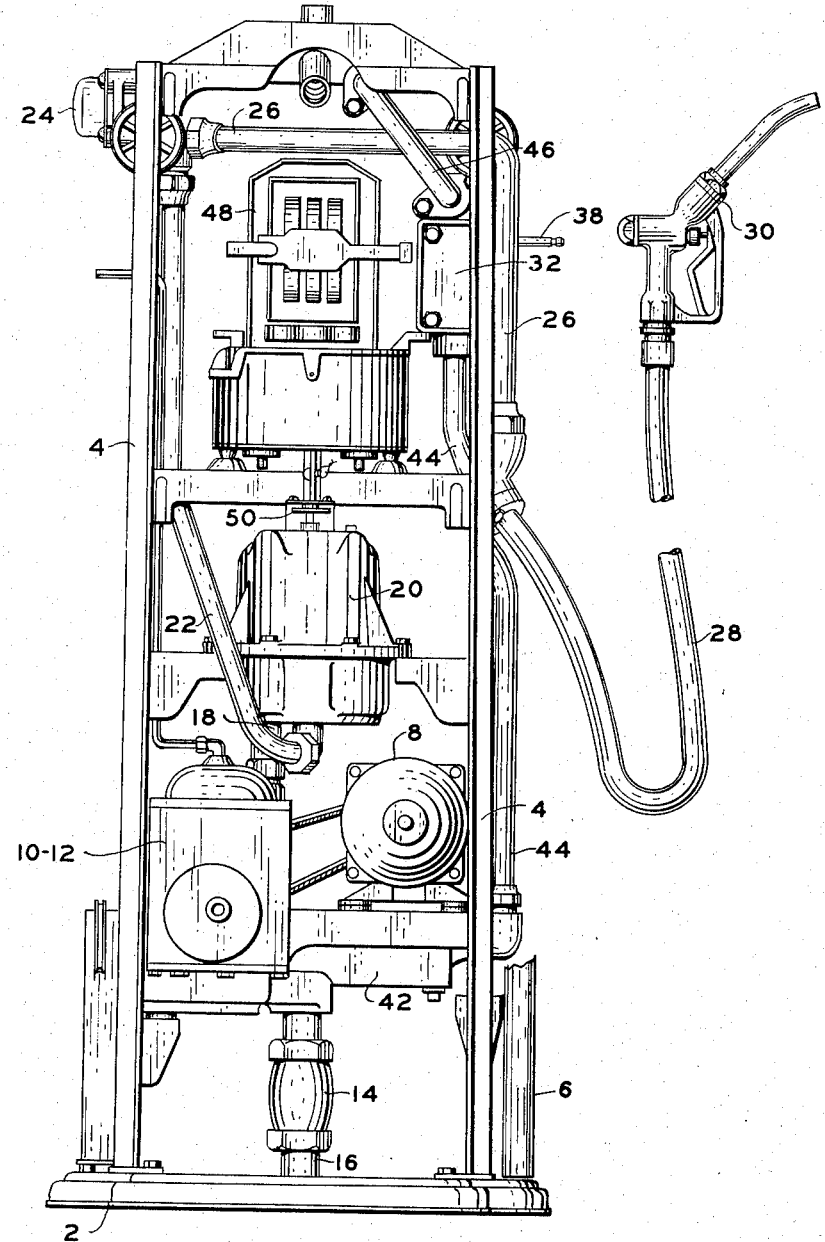
Figure 1 is an elevation of a dispenser showing generally the relations of the various components.

Figure 1 shows the general dispenser structure which comprises a base 2, frame members 4 on which are mounted housings 6 (Fig. 13), an electric motor 8 and a pump and air separator unit 10—12. The pump is driven through a suitable belt from the electric motor. It has a suction pipe 14 for connection with a supply line 16 and a discharge pipe 18 which is connected with a meter 20. The latter has a discharge pipe 22 which connects with a visigage 24 which is in turn connected by piping 26 to a hose 28 having a valved nozzle 30.

Figure 14:
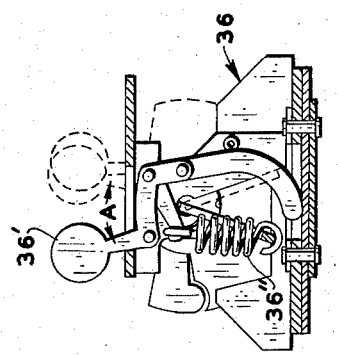
Figure 14 is a cut away view of the switch showing the lost motion effect.

A switch box 32 is mounted on the frame and houses a motor control switch 36 (Fig. 4) which is operated by push rod 40 (Figs. 4 and 14). The switch is a toggle switch which has an actuating lever 36' which must be moved through a predetermined arc A to strain springs 36" after which the switch blades move quickly or "snap" to their opposite position. This occurs in either direction of movement of the lever and thus provides the lost motion required to permit the interlocking of the handle without opening the switch as described below. The main supply lines enter a junction box 42, and the motor is connected with these lines through switch 36 by wires running through the conduit 44.

The meter is connected to drive a computer 48 through suitable connections 50. A computer which registers both quantity and cost has been shown in Figures 2 and 3 although a non-computing type of register may be used.

COMMERCIAL COMPUTER

Figures 2 and 3

It is to be understood that the computing register shown in Figures 1 to 3 is one which is commercially available and which is modified by the omission of certain parts and the addition of others to incorporate my invention. In order to explain my invention, it is first necessary to explain briefly the construction and operation of certain portions of the commercial structure.

In the structure shown in Figure 2, the register 5 will indicate the total gallons dispensed in a transaction and register 7 will indicate the cost of the sale which is a product of the numbers on the registers 5 and 9, the latter being the price per gallon register.

It is necessary to reset the registers 5 and 7 to zero before delivering fuel in a succeeding dispensing operation or transaction and this is accomplished prior to the closing of the switch 36.

The shaft 11 is the reset drive shaft for the registers 5 and 7 of register 48 while the shaft 13 serves a similar purpose for the corresponding registers on the opposite side of the dispenser (not shown). The shafts are connected to be driven by the gears 15 and 17 respectively which are in mesh with a common gear 19. The latter has a ratchet 21 fixed to it and is rotatable with respect to the shaft 23. A holding pawl 25 is pivoted at 27 on the frame 77 of the computer and is urged into engagement with the ratchet 21 by a spring 29.

A ratchet disc or control element 31 is provided with a hub 33 which is fixed to shaft 23. The disc carries three peripheral interlock teeth 35, 37, 39 on one side and a single tooth 41 on the opposite side, the latter being formed by notching the disc at 43.

A cam disc or resetting member 45 is rotatably mounted on an extension of the hub 33 which projects through the disc 31.

An actuating pawl 49 is pivotally mounted on disc 45 by means of a pin 51 and is urged into contact with the ratchet 21 by means of a spring 53 which is hooked at one end in a projection 55 on the pawl and at the other end in a projection 57 on the cam disc 45.

A cocking pawl 59 is pivotally mounted at 61 on the cam disc 45 in a position to engage the tooth 41 and it is urged into engagement with said tooth by means of a spring 63 which is connected at one end to a projection 65 on the pawl and at the other end to a pin 67 fixed in the cam disc.

The cam disc 45 carries projection 69 in which is mounted a grooved stud 71. A strong tension spring 73 is hooked at one end in the groove of the stud and at the other end to a fixed, grooved stud 75 on the frame 77 of the computer so that the disc 45 is urged in a clockwise direction (Fig. 2) by the spring.

A dashpot mechanism 79 has its cylinder 81 pivotally mounted at one end on a stud 47 on the frame and the piston rod 83 is pivotally connected to the cam disc at 85. The dash pot is constructed so that the piston rod will move freely out of the cylinder but resists motion in the opposite direction so that it will slow the rotation imparted to the disc by the spring 73.

The cam disc 45 has a first cam 87 formed on its periphery which is adapted to engage a pin 89 which extends from a projection 91 on pawl 25 into the path of the cam. When the cam disc moves counterclockwise (Fig. 2) as will be described, the cam will lift the pawl 25 out of holding engagement with ratchet 21.

Pivotally mounted in the frame of the computer is a shaft 93 and pivotally mounted on the shaft is a pawl 95 which is positioned to move into engagement with the interlock teeth 35, 37 and 39 to hold the ratchet disc in certain of its rotative positions. The pawl carries a projecting arm 97 to which is connected one end of a spring 99, the other end of the spring is hooked on a pin set in the frame.

A trip pawl 103 has its hub 105 pinned to shaft 93 which is rotatably mounted in the frame and has a bent over end 107 which overlies the tail 109 of cocking pawl 59. A downwardly extending arm 111 of the trip pawl is connected to one end of a spring 113 the other end of which is hooked on a pin on the frame. The pawl is thus urged in a counterclockwise direction by the spring 113, away from the tail 109. This motion is limited by contact between a stop 115 mounted on the frame which contacts the arm 111 of the pawl.

The upper end of pawl 95 carries a pin 117 which projects over the periphery of the cam disc 45 in a position to be actuated by the second cam 119 on the disc 45 upon clockwise rotation thereof so that the pawl 95 will be moved out of engagement with the tooth 35 as will be explained. The pin 117 is also engaged by the stop projection 121 on the cam disc to limit the clockwise rotation thereof under the action of the spring 73.

Referring now to Figure 3, the shaft 23 runs entirely through the computer and has fixed to the protruding end thereof the cam 123. A slide bar 125 is slidably mounted for endwise translation in guide lugs 127, 129 formed on the frame. The bar is slotted at 131 to clear the shaft 23.

A pair of rollers 133, 135 are rotatably mounted on suitable studs 137, 139 set in the bar and ride on opposite portions of the cam when the line joining the points of contact A—A or B—B is aligned with the line joining the centers of the rollers. Thus in at least these two positions, the bar is held against endwise displacement.

As shown in Figure 3, the points A—A are aligned with the roll centers and the cam occupies this position when the ratchet disc occupies the position shown in Figure 2. The points B—B are aligned with the roll centers when the ratchet disc 31 occupies its normal running position which will be described below.

The bar 125 is provided with openings 167, 169 which receive the ends of levers 163, 165. The latter are fixed to shafts 151, 153 mounted in inclined, upwardly converging positions on the computer frame by means of bearings 152.

Gear sectors 155, 157 are mounted on opposite ends of shaft 151 while similar sectors 159, 161 are mounted on shaft 153. These sectors mesh with racks 141, 143, 145 and 147 respectively of the clutch operating shafts on which the dial indicators of the registers 5 and 7 are mounted.

When the cam 123 moves counterclockwise from the position shown in Figure 3 to the position in which the points B—B align with the roll centers, the portion of the cam on the right hand side, between points A and B acts on roll 133 to move the bar to the right whereas when the cam moves clockwise from the latter position to the position of Figure 3, the portion of the cam on the left side acts on roller 135 to move the bar to the left.

The bar 125, in the position shown in Figure 3 has rotated the levers 163 and 165 and associated parts in a counterclockwise direction when viewed from the top, and has pulled clutch shafts 145, 147 outwardly toward the viewer and has forced shafts 141, 143 inwardly away from the viewer. In this condition the indicator wheels of all of the registers have been declutched from the drive shaft and drive trains which normally drive them in an advancing direction as the meter rotates and they have been clutched to the reset drive trains (not shown) which are operated by the shafts 11 and 13 of reset gears 15 and 17.

When the bar occupies its opposite position, all of the indicator wheels of the registers have been declutched from the reset drive mechanism and have been clutched to the meter driven mechanism.

OPERATION

The cycle of the register and register control system, starting with the parts in the Figure 2 and Figure 3 positions is substantially as follows:

(1) The trip pawl 103 is rotated clockwise to cause the bent end 107 to contact the tail 109 of cocking pawl 59 and to thereafter rotate it counterclockwise out of engagement with tooth 41.
    *a.* The pawl is restored to its initial position by spring 113.
(2) This frees the cam disc 45 which is rotated clockwise with respect to ratchet disc 31 by spring 73.
    *a.* During this rotation of the cam disc, the reset pawl 49 rotates its ratchet 21, the reset gears 15, 17 and 19 and since the indicator dials are clutched to the reset drive, they are reset to zero.
    *b.* Near the start of the rotation of the cam disc, the cam 87 disengages pin 89 so that holding pawl 25 will engage its ratchet 21 but it will ride over the teeth thereof so long as the ratchet is moving clockwise.
    *c.* Near the end of this movement of the cam disc, cam 119 actuates pin 117 and withdraws pawl 95 from tooth 35 of the ratchet disc.
    *d.* Thereafter stop 121 strikes pin 117 to terminate rotation of the cam disc.

*e.* The motion of the cam plate is slowed by dashpot 79.

(3) The ratchet disc 31 is thus freed for clockwise rotation past a point at which tooth 41 and pawl 59 would reengage.
  *a.* As this rotation is accomplished, to a position established by stop means (not shown), the cam 123 (Figure 3) will rotate counterclockwise to move the bar 125 to its right hand position. This declutches the register dials from the reset train and clutches them to the motor drive so that any movement of the meter will advance the registers.
  *b.* For reasons which will become apparent, the ratchet disc 31 is then preferably rotated counterclockwise until tooth 41 thereof engages the cocking pawl 59. The corresponding movement of cam 123 does not disturb the clutches.

(4) When the registering function is completed, the ratchet disc 31 is rotated in a counterclockwise direction.
  *a.* Since the tooth 41 thereof and cocking pawl 59 are engaged, the cam disc 45 will also be rotated in the same direction.
  *b.* The actuating pawl 49 which is carried by cam disc 45 rides idly over the teeth of ratchet 21 which is held against counterclockwise rotation by pawl 25.
  *c.* The cam 119 moves from under pin 117 so that pawl 95 will be reengaged successively with teeth 39, 37, 35 of ratchet disc 31 by spring 99 so as to hold it against clockwise rotation.
  *d.* The clutch cam 123 is also rotated to move the bar 125 to the Figure 3 position so that the registers are declutched from the meter and are clutched to the reset drive train.
  *e.* As the cam 87 moves under pin 89, the pawl 25 is disengaged from ratchet 21 which is now held by the reset pawl 49.
  *f.* The described movement of the cam disc 45 also cocks spring 73 and extends the piston rod 83 of the dash pot. This occurs without substantial resistance from the dashpot.
  *g.* It should be noted that the tail 109 of the cocking pawl is not brought into position to be actuated by trip pawl 103 until tooth 35 is engaged by pawl 95 to hold the parts in their initial position. This compels a complete movement of disc 31, otherwise the mechanism is unable to function further.

Thus the parts are all restored to their initial positions as shown in Figures 2 and 3, to complete the cycle.

The structure just described requires the operation of two distinct mechanisms, in series, to start dispensing, namely hub 105 must be rotated clockwise and restored, and thereafter hub 33 must be similarly rotated clockwise. A single rotation of hub 33 in a reverse direction is required to stop dispensing since hub 105 is spring restored. It is advantageous to perform the starting functions by moving a single lever in one direction and to stop the dispenser by moving the lever in a reverse direction to restore the lever to its initial position.

One such mechanism is disclosed, in my prior application Serial Number 606,342, filed August 27, 1956, for Switch and Register Control Mechanism. The mechanism disclosed herein is an improvment over my prior disclosure.

REVISED COMMERCIAL COMPUTER

Figures 6 to 12

Figure 6:
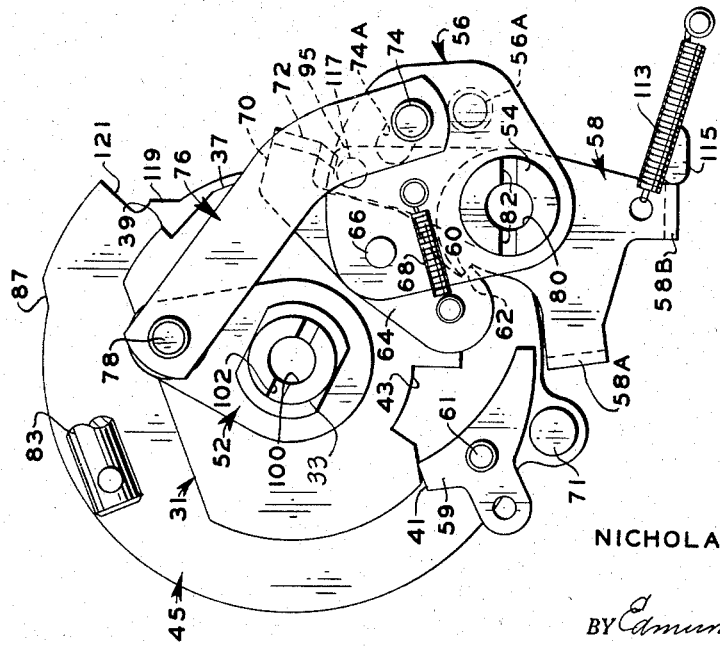
Figure 6 is an elevation showing the mechanism in its initial or normal position.

Referring particularly to Figures 2 and 6, a crank 52 is added to the hub 33 and is fixed thereto so that it will rotate the hub and ratchet disc 31.

The trip pawl 103 together with its hub 105 and arm 111 are removed from the shaft 93 and a hub 54 which carries a wrist plate 56 is pinned to the shaft in its place. Wrist plate 56 carries a stud 56A on its rear face. A trip pawl 58 is loosely mounted on the hub 54 and carries an arm having a lateral projection 58A which performs the function of tripping the dog 59 just as did the pawl 103. It also has a projection 58B which coacts with the stop 115 and spring 113 to retract the trip pawl to a predetermined initial position in the same manner as the arm 111 on the commercial computer.

The trip pawl is also provided with a tooth 60 which is adapted to be engaged by a hook or projection 62 on a control pawl 64 which is pivotally mounted on a pin 66 fixed in the wrist plate 56. A coil spring 68 is connected by suitable pins to the wrist plate and the pawl 64 to rotate the latter counterclockwise (Fig. 6) to cause hook 62 to engage tooth 60.

The control pawl has another arm 70 which is provided with a lateral projection 72 which lies in the path of the stop projection 121 of cam disc 45 which moves as described below to contact and thereafter rotate the control pawl 64 clockwise so that it will unlatch hook 62 from the tooth 60 of the trip pawl.

A pin 74 on one end of a bent link 76, the other end of which is pivotally mounted on a pin 78 of crank 52, rides in a lost motion slot 74A in the wrist plate.

Figure 13:
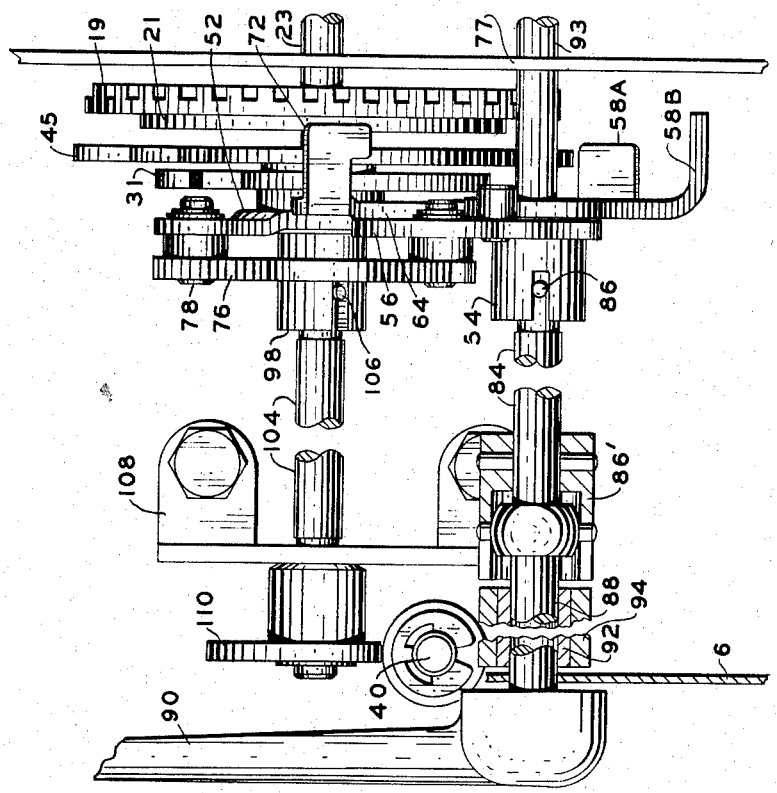
Figure 13 is an elevation of the mechanism viewed from the right of Figure 6 and showing the handle and switch operator.

The hub 54 is provided with a central cavity 80 and an intersecting diametrical slot 82 which receive respectively, a connecting shaft 84 and a drive pin 86 fixed transversely in the shaft 1 (see Figure 13).

The other end of shaft 84 is pinned in a socket 86' which has a separable pin and slot connection with shaft 88 which is fixed in the hub of actuating lever 90. The shaft 88 is rotatably mounted in a bearing 92 which is mounted on the nozzle boot 94 (Fig. 5).

The crank, bearing 92, nozzle boot 94 and shaft 88 are removable from the frame of the dispenser as a unit with the housing 6.

The hub 33 of the crank 52 and element 31 is provided with a recess 100 and an intersecting slot 102 which receive the end of a shaft 104 and a cross pin 106 respectively. The other end of the shaft passes through a bearing 108 which is mounted on the switch box 29 and carries a cam 110 which is adapted to actuate the plunger 40 of the motor switch 36. (See Fig. 4.)

As will be seen from Figure 5, the actuating lever 90 occupies a vertical normal or initial position adjacent the nozzle boot 94 on which a fixed nozzle support 114 is mounted. The nozzle 30 rests on the support with its spout and a portion of its guard extending into the boot when the dispenser is not in use.

With the lever 90 in a vertical position the cam 110 is in a position which will permit the switch plunger 40 to occupy its fully extended position (Fig. 4). The remaining parts of the mechanism are in the positions shown in Figure 6 wherein the reset spring 73 is stretched, dog 59 engages the tooth 41 of the ratchet disc and the latter is held against rotation by pawl 95 which is engaged with the interlock tooth 35 as shown in Figure 2.

This is the normal, inoperative condition of the dispenser between delivery transactions.

OPERATION

Figures 2 to 12

When it is desired to deliver fuel, the operator removes the nozzle from the support 114 and rotates the lever 90 in a clockwise direction (Figure 5) from its initial position to the first position which is approximately 12 degrees from the vertical.

The control mechanism is in the condition shown in Figure 6 when the lever occupies its initial position. This initial rotation of the lever and of the wrist plate, which is connected to it through shafts 84, 88 is limited by contact between the left end of slot 74A and the pin 74, the crank and the control element which is latched by pawl 95 and interlock tooth 35. This movement causes the control pawl 64 to move clockwise with the plate. Since its projection 62 is engaged with tooth 60 on the trip pawl 58, it causes the trip pawl to rotate clockwise so that its projection 58A will rotate latch dog 59 counterclockwise to a position shown by dashed lines in Figure 7, to free cam disc 45 from ratchet disc 31. The latter remains held against rotation by pawl 95 and interlock tooth 35.

The pin 74 is held against mvement by reason of its connection with ratchet disc 31 through link 76 and crank 52.

As soon as the dog 59 is tripped, the reset spring 73 rotates the cam disc 45 clockwise to the Figure 7 full line position so that pawl 49 (Fig. 2) drives ratchet 21, gears 19, 17 and 15 through a full stroke to reset the dials of registers 5 and 7 in the manner described above. The dials of the registers are clutched to the reset train during this phase of the cycle.

In arriving at its Figure 7 position, the cam 119 of the cam disc will have released pawl 95 from tooth 35 of the ratchet disc and stop 121 will have engaged the projection 72 of control pawl 64 and will have rotated it clockwise as shown in Figure 7, so that tooth 60 of trip pawl 58 is released from hook 62. The freed trip pawl will immediately be rocked counterclockwise to its initial position (Fig. 6) by spring 113. This position is determined by projection 58B which strikes stop 115.

Pawl 25 (Fig. 2) will have been moved by spring 29 into engagement with ratchet 21 due to the withdrawal of cam 87 from the pawl.

Since disc 31 is now released from pawl 95 and since wrist plate 56 is freed from trip pawl 58, lever 90 may now be rotated clockwise approximately an additional 94 degrees to its extreme position (Figs. 5 and 8) where it is stopped by the engagement of stud 56A with trip pawl 58 which is rotated clockwise until it is stopped by the engagement of projection 58A with the edge of ratchet disc 31. During this rotation of lever 90, shafts 23 and 104 which are driven by hub 98 are rotated by crank 52 to move cams 123 and 110 respectively to first clutch the register dials to the meter and subsequently to close the switch. The switch closure occurs with the handle at about 90 degrees from its initial position (Fig. 5).

The lever is released by the operator and is rotated counterclockwise about 27.5 degrees to the second or running position (Figs. 5 and 9), about 78.5 degrees from the initial position, by spring 113, trip pawl 56 and pin 56A as shown in Fig. 9 and by the switch plunger spring 110' which rotates cam 110, and ratchet disc 31 counterclockwise until tooth 41 of the ratchet disc engages latch dog 59. This engagement determines the running position of the parts as shown in Figures 5 and 9. The pin 74 however still occupies the same end of slot 74A so that the lost motion is not taken up in the counterclockwise direction.

During the clockwise rotation of lever 90 from the first position to the extreme position and at a position approximately 90 degrees away from the initial position, crank 52, shaft 104 and cam 110 will have been rotated far enough to have depressed the switch rod 40 and lever 36' far enough to have strained the switch springs so that they will cause the switch 36 to snap closed. The further movement of lever 90 to the extreme position represents merely overtravel which insures that the switch will be closed in spite of manufacturing variations and tolerances.

The switch 36 is of the toggle snap-action type so that while the movement of lever 90 from the extreme position to the running position is accompanied by reverse rotation of cam 110 and partial ejection from the switch box, of the switch plunger 40 by its spring to a position outward of that which it occupied when the switch closed, and partial reverse movement of switch lever 36', such motion is lost motion and is not sufficient to reopen the switch.

Since the apparatus is now in "running" condition, the operator proceeds to make the delivery in the usual manner.

It should be noted that in its extreme, 4th and running positions, the lever 90 extends over the entrance of the nozzle boot and over the nozzle support so that it will engage the nozzle guard so as to prevent the nozzle from being mounted with its nozzle guard on the hose support and the nozzle spout in the boot. Thus the nozzle cannot be properly restored to the support while the motor switch is closed.

When the delivery has been completed, the operator will rotate lever 90 counterclockwise from its running position to its overtravel position through the third, fourth, first and initial positions, in that order. The third and fourth positions are about 53 and 43.5 degrees respectively from initial position. Since the lever 90 now clears the boot, the nozzle may be properly restored to the nozzle support and boot.

The first portion of the movement of lever 90 from running position to the third position (Figs. 5 and 10) will take up the lost motion 74—74A, since this has not yet occurred, and the remainder of the movement to the third position will rotate the ratchet and cam discs 31, 45 far enough to release pin 117 of pawl 95 from cam 119 and move tooth 39 of the ratchet disc far enough to cause it to be engaged by pawl 95 (Fig. 10). Even with the lever 90 in this position, the switch rod 40 is not ejected far enough from the switch box to take up the lost motion in the switch mechanism and open the switch. It requires further rotation of the lever to the fourth position (Figs. 5 and 11) to secure ejection of the switch rod far enough to take up all of the lost motion in the switch mechanism so as to cause the switch 36 to snap to its open position.

Figure 12:
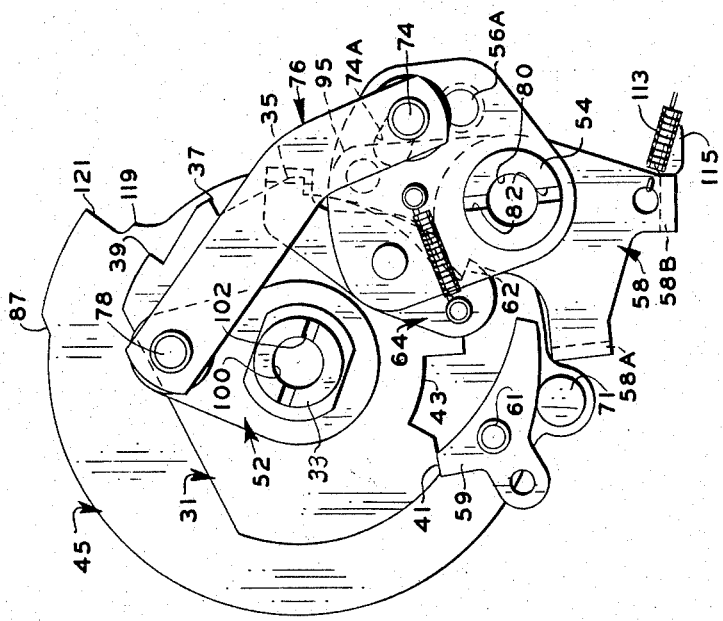
Figure 12 shows the mechanism in the "overtravel" position beyond the initial position.

Further, because the lever 90 cannot now be returned to the switch closing position by reason of the engagement of tooth 39 and pawl 95, the switch will remain open. Therefore, in order to make a further delivery, it is necessary to complete the cycle which is done by returning the lever 90 counterclockwise through the initial position to the overtravel position (Fig. 12). The overtravel of the lever past the initial position is provided to insure that pawl 95 solidly engages tooth 35 of the ratchet disc and the amount of overtravel is limited by contact between projection 58A of the trip pawl and the anchor pin 71 for the reset spring 73. As soon as manual pressure is removed from lever 90, spring 73 will return the parts to the initial position (Fig. 6) which is determined by tooth 35 and pawl 95 acting through disc 31, tooth 41, dog 59 and the cam disc 45.

During the movement of the lever from the third to the overtravel position, tooth 37 and next tooth 35 come into successive engagement with pawl 95 to latch the ratchet disc against clockwise rotation first in an intermediate and finally in its initial position.

The counterclockwise rotation of lever 90 and its associated parts from running position to the over travel position effects the cocking of spring 73 and the actuation of cam 123 to clutch the register wheels to the reset train as described above.

With the lever 90 and the associated mechanisms in their initial positions, the nozzle may be installed in the proper manner in the nozzle boot and on the hose support, so that the dispenser is now restored to its initial condition.

It is obvious that various changes may be made in the form, structure and arrangement of parts of the specific embodiment of the invention disclosed herein for purposes of illustration, without departing from the spirit of the invention. Accordingly, applicant does not desire to be limited to such specific embodiment but desires protection falling fairly within the scope of the appended claims.

What I claim is:

1. In a control mechanism for a liquid dispenser which includes a resettable register adapted to register the liquid dispensed, indicator resetting means, including a rotatably mounted resetting member, adapted to reset said resistor when the member is rotated in a first direction, a spring connected to rotate said resetting member in said direction, a rotatably mounted control element, first releasable connecting means for connecting said element to rotate said resetting member in a second direction to load said spring, means for latching said control element in a spring loaded position, said resetting means including means, effective upon substantial completion of resetting for releasing said latching means, trip means mounted for movement to and from a position for releasing said first connecting means, the improvement which comprises a pivotally mounted handle, a mechanism including a lost motion device and a pivotally mounted actuator, connected for operation by said handle and connected to rotate said control element in directions correlative with the direction of movement of said handle, second releasable connecting means for connecting said actuator to move said trip means to releasing position in response to movement of said mechanism in said first direction through the distance permitted by said lost motion means, means operable by said resetting means when resetting is substantially completed, for releasing said second connecting means, a flow control device movable to start and stop the flow of liquid and means operable simultaneously with said control element, upon further movement of said handle in said first direction after the release of said latching means, for actuating said flow control device to start the flow of liquid.

2. The structure defined by claim 1 wherein said second releasable means comprises a pawl pivotally mounted on said actuator, a projection on said trip means and yieldable means for urging said pawl into latching engagement with said projection, said actuator and trip means being mounted substantially coaxially so that rotation of said actuator in said one direction wil be transmitted to said trip means through said pawl and said projection.

3. In a control mechanism for a liquid dispenser which includes a resettable register adapted to register the liquid dispensed, said register having a frame, register resetting means, including a resetting member rotatably mounted on the frame adapted to reset the register when the resetting member is rotated in one direction, a spring connected to rotate said member in said direction, a control element rotatably mounted on the frame, first releasable connecting means for connecting said control element to rotate said member in the opposite direction, to load said spring, trip means operable to release said connecting means, means for latching said control element in a spring loaded position, said resetting member including means, effective upon substantial completion of its rotation in said one direction, for releasing said latching means, the improvement which comprises a pivotally mounted handle, an actuator pivotally mounted on said frame and connected for operation by said handle through distances proportional to the distances and in directions correlative with the directions of movement of said handle, a mechanism, including a lost motion device, connecting said actuator to rotate said control element, second connecting means for connecting said actuator to move said trip means to releasing position in response to movement of said actuator in one direction through the distance permitted by said lost motion means.

4. The structure defined by claim 3 wherein second connecting means is releasable and said resetting member includes means for releasing said second connecting means and said latching means substantially at the completion of resetting, to free said actuator and said control element for further movement by said handle in said one direction and means including a second lost motion device and a flow control device adapted to start and stop the flow of liquid, operated simultaneously with said control element to move said flow control device to start the flow at a predetermined point in said further movement.

5. The structure defined by claim 4 which includes means for moving said handle, actuator and control element in said second direction to reestablish said first connecting means, said second lost motion device serving to prevent movement of said flow control device to stop the flow in response to the last mentioned movement of said handle.

6. The structure defined by claim 4 which includes means for withdrawing said trip means from releasing position when said second connecting means is released.

7. The structure defined by claim 4 which includes stop means to limit the movement of said trip means in a releasing direction, means carried by said actuator, positioned to engage said trip means and move said trip means into engagement with said stop means during further movement of said handle in said one direction beyond said predetermined point, to determine the extreme position of said control element, handle and actuator.

8. In a control mechanism for a liquid dispenser which includes a resettable register adapted to register the liquid dispensed, resetting means, including a rotatably mounted resetting member, adapted to reset said register when the member is rotated in a first direction, a spring connected to rotate said resetting member in said direction, a rotatably mounted control element, first releasable connecting means for connecting said element to rotate said resetting member in a second direction to load said spring, first latching means for latching said control element in a spring loaded position, second latching means for latching said control element against rotation in said first direction by said spring when the spring is only partially loaded, said resetting means including means, effective upon substantial completion of resetting for rendering said first and second latching means ineffective, trip means mounted for movement to and from a position for releasing said first connecting means, the improvement which comprises a pivotally mounted handle, a mechanism comprising a lost motion device, connected to operate said control element and connected for operation by said handle in directions correlative with the directions of movement of said handle, means operable by said handle to move said trip means to releasing position in response to movement of said handle in one direction through the distance permitted by said lost motion device, to cause resetting and the release of said first latching means, a switch, means, including a second lost motion device, operated simultaneously with said control element for closing said switch at a predetermined position in the further motion of said control element by said handle and mechanism in said one direction after the release of said first latching means, means for thereafter moving said handle, mechanism and control element in a second direction through said predetermined position to a second predetermined position to reestablish said first connecting means, said handle being movable thereafter in said second direction to a third predetermined position to render said second latching means effective, said second lost motion device serving to prevent opening of said switch during the described motions of said control element in said second direction.

9. The structure defined by claim 8 wherein said switch operating means opens said switch upon further movement of said handle, mechanism and control element in said second direction beyond said third predetermined position, said second latching means serving to prevent the return of said handle to said first predetermined position so as to prevent reclosing of said switch without resetting said register.

10. In a control mechanism for a liquid dispenser which includes a register adapted to register the liquid dispensed and to be reset to zero, resetting means, including a rotatably mounted resetting member, adapted to reset said register when the member is rotated in one direction, a spring connected to rotate said member in said direction, a rotatably mounted control element, releasable connecting means for connecting said element to rotate said member in the opposite direction to load said spring, trip means for releasing said connecting means, first latching means for latching said element in a spring loaded position, second latching means for latching said element against rotation in said one direction by said spring from a position short of the spring loaded position, said resetting means including means effective upon substantial completion of resetting for rendering said first and second latching means ineffective, the improvement which comprises a handle mounted for movement in one direction from an initial position to a first position, a mechanism including a lost motion device for connecting said handle with said control element to move it in directions correlative with the directions of motion of said handle, said mechanism serving, with said element and said first latching means, to stop said handle in said first position, means operable by said handle during its movement to said first position for actuating said tripping means to release said connecting means, said spring and resetting means operable by said handle during its movement to said first and second latching means ineffective, said handle, mechanism and control element being movable after such release through a second position, to an extreme position and in a reverse direction to said second position, means for returning said handle, mechanism and element to said second position, a switch, switch actuating means, including a second lost motion device, operable simultaneously with said control element to close said switch during passage of said handle from said second to said extreme position, said handle, mechanism and control element being movable further in said reverse direction to a third position to render said second latching means effective and to a fourth position to operate said switch actuating means to open said switch, said second lost motion device serving to prevent opening of said switch during passage of said handle from said extreme position to said third position, said second latching means serving to prevent reclosure of said switch without first resetting the register.

11. In a control mechanism for a liquid dispenser which includes a frame, a housing panel on said frame, a nozzle support and a nozzle boot on said panel, a handle pivotally mounted on said panel for movement to and from positions blocking said boot and nozzle support, to prevent the positioning of a nozzle simultaneously on said support and in said boot, a resettable register mounted on the frame, adapted to register the liquid dispensed, register resetting means, including a rotatably mounted resetting member, adapted to reset said register when the member is rotated in a first direction, a spring connected to rotate said resetting member in said direction, a rotatably mounted control element, first releasable connecting means for connecting said element to rotate said resetting member in a second direction to load said spring, first latching means for latching said control element in a spring loaded position, second latching means for latching said control element against rotation by said spring when the spring is only partially loaded, said resetting means including means, effective upon substantial completion of resetting for rendering said first and second latching means ineffective, trip means mounted for movement to and from a position for releasing said first connecting means, the improvement which comprises a mechanism, comprising a lost motion device, connected to operate said control element and connected for operation by said handle in directions correlative with the directions of movement of said handle, means operable by said handle to move said trip means to releasing position in response to movement of said actuator in one direction through the distance permitted by said lost motion device, to cause resetting and to render said first and second latching means ineffective, a switch, means including a second lost motion device, operated simultaneously with said control element for closing said switch at a predetermined position in the further motion of said control mechanism by said handle and mechanism in said one direction after the latching means are rendered ineffective, means for thereafter moving said handle, mechanism and control element in a second direction through said predetermined position to a second predetermined position to reestablish said first connecting means said handle being movable thereafter in said second direction to a third predetermined position to render said second latching means effective, said second lost motion device serving to prevent opening of said switch during the described motions of said handle in said second direction, said handle serving to block said nozzle support and boot in all of the positions it occupies while said switch is closed.

12. In a control mechanism for a liquid dispenser, a flow control device having flow starting and flow stopping positions, a resettable register adapted to register the liquid dispensed, a frame for said register power means for resetting said register, a rotatably mounted control element connected to operate said flow control device, means for latching said control element with said flow control device in flow stopping position, a pivotally mounted handle, actuating means mounted on said frame and connected for operation by said handle when it is moved in one direction, for causing said power means to reset said register, means operable by said power means substantially at the completion of resetting to release said latching means, means operable by said actuating means, upon further movement of the handle in the same direction, to move said control element and flow control device to said flow starting position.

13. In a control mechanism for a liquid dispenser, a flow control device having flow starting and flow stopping positions, a resettable register adapted to register the liquid dispensed, power means for resetting said register, a control element rotatably mounted on said register, means connecting said control element to operate said flow control device, means for latching said control element against rotation in a direction to operate said flow control device to flow starting position, a pivotally mounted handle, actuating means connected for operation by said handle when it is moved in one direction, for causing said power means to reset said register and release said latching means, means operable by said actuating means, upon further movement of the handle in the same direction to a predetermined position, to move said control element and flow control device to said flow starting position, second latching means disposed so as to become effective upon reverse movement of said handle from said predetermined position, to prevent return movement of said handle to said predetermined position without resetting said register, said first named connected means being adapted to operate said flow control device to flow stopping position upon further reverse movement of said handle after said second latching means becomes effective.

14. In a control mechanism for a liquid dispenser, a flow control device having flow starting and flow stopping positions, a resettable register adapted to register the liquid dispensed, power means for resetting said register, a control element connected to operate said flow control device, means for latching said control element with said flow control device in flow stopping position, a pivotally mounted handle having an initial position, actuating means connected for operation by said handle when it is moved in one direction, for causing said power means to reset said register and release said latching means, said actuating means serving upon further movement of the handle in the same direction to move said control element and flow control device to said flow starting position, a housing for said dispenser, a nozzle support, a nozzle boot on said housing disposed adjacent said nozzle support, means for mounting said handle relative to said support and said boot so that said handle does not obstruct said support and boot when it occupies said initial position but prevents the positioning of a nozzle in said boot and on said support in any position occupied by said handle while said control device occupies the flow starting position.

15. In a control mechanism for a liquid dispenser which includes a resettable register adapted to register the liquid dispensed, resettable means, including a rotatably mounted resetting member, adapted to reset said register when the member is rotated in a first direction, a spring connected to rotate said resetting member in said direction, a rotatably mounted control element, first releasable connecting means for connecting said element to rotate said resetting member in a second direction to load said spring, means for latching said control element in a spring loaded position, said resetting means including means, effective upon substantial completion of resetting for releasing said latching means, trip means mounted for movement to and from a position for releasing said first connecting means, the improvement which comprises a pivotally mounted handle, a mechanism including a lost motion device, connected for operation by said handle and connected to operate said control member in directions correlative with the directions of movement of said handle, means for connecting said handle to move said trip means to releasing position in response to movement of said actuator in one direction through the distance permitted by said lost motion device and flow control means, operable simultaneously with said control element, to control the delivery of liquid from said dispenser, said mechanism comprising a wrist plate, mounted for rotation upon said register about an axis disposed substantially parallel to that of said control element and connected for rotation by said handle, a crank connected to said control element and a link connecting said crank with said wrist plate through said lost motion device.

16. The structure defined by claim 3 which includes means for pivotally mounting said trip means on said frame, coaxially with said actuator, said second connecting means including a pivotally mounted pawl and a tooth for engagement thereby, said pawl and tooth being mounted one on said trip means and the other on said actuator and serving, when engaged, to connect said trip means for rotation in one direction by said actuator and yieldable means for urging said pawl and tooth into engagement.

17. The structure defined by claim 16 which includes a stop on said resetting member, and means, mounted for operation by said stop, substantially upon completion of resetting, to disconnect said pawl and tooth.

18. The structure defined by claim 17 which includes means on said actuator disposed to engage said trip means, as said actuator is further pivoted by said handle after disconnection of said second connecting means, said means serving thereupon to move said trip means into engagement with said control element to limit the rotation of said handle in said one direction.

19. The structure defined by claim 3 wherein said trip means is movable between initial and tripping positions.

20. The structure defined by claim 3 which includes flow control means connected for operation with said control element.

References Cited in the file of this patent
UNITED STATES PATENTS

| | | |
|---|---|---|
| 2,132,637 | Marden | Oct. 11, 1938 |
| 2,173,477 | Gross | Sept. 19, 1939 |